March 6, 1951 D. A. WALTHER 2,543,749
TRACTOR FIFTH WHEEL MOUNTING
Filed July 17, 1948

INVENTOR.
Daniel A. Walther
BY
Ely & Frye
Attorneys

Patented Mar. 6, 1951

2,543,749

UNITED STATES PATENT OFFICE 2,543,749

TRACTOR FIFTH WHEEL MOUNTING

Daniel A. Walther, Dayton, Ohio, assignor to The Dayton Steel Foundry Company, Dayton, Ohio, a corporation of Ohio Application July 17, 1948, Serial No. 39,225

5 Claims. (Cl. 280—33.05)

The present invention relates to mountings for fifth wheels such as commonly used on the tractor of tractor-semi-trailer constructions.

These devices are well known in the trade and consist of a large flat bearing platform or plate which is pivotally mounted on brackets attached to the rear of the tractor. The plate is provided with a rearwardly opening flaring slot designed to receive the king pin on the forward end of the trailer and with suitable jaws by which the king-pin is locked in position when the two vehicles are in coupled relation. The fifth wheel is usually unbalanced so that it rocks downwardly when the vehicles are uncoupled until the rear end thereof rests upon the floor of the tractor, thereby holding the fifth wheel in a tilted position to pass under the forward end of the trailer when the tractor is backed into coupling relation.

Although attempts have been made to improve the mountings for the tractor fifth wheel, the standard method is to mount the fifth wheel directly upon transverse pins secured in the brackets on the body of the tactor. These standard bearings should be lubricated frequently and, as the bearing is a metal-to-metal contact, it is rigid so that the shocks and vibrations from one vehicle are transmitted to the other. The fifth wheel will sometimes remain in horizontal position in spite of its unbalanced condition and does not tilt downwardly when the vehicles are uncoupled. If the driver fails to note and correct this condition accidents may occur when the vehicles are being coupled.

It is one object of the invention to devise a satisfactory mounting for the fifth wheel that will dispense with the necessity of any lubrication at the bearings and will serve as a cushioning medium between the tractor and the trailer and thus absorb much of the relative movement between the vehicles when in operation. It is a further object of the invention to so mount the fifth wheel on the tractor that the resilient bearing is placed under compressional strain when the fifth wheel is horizontal, as when the vehicles are coupled, so that when the vehicles are uncoupled the recovery from compression will insure that the fifth wheel tips downwardly into its proper idle position.

The invention represents an improvement over the fifth wheel mounting shown and claimed in U. S. Patent No. 2,438,323 wherein the fifth wheel is biased to proper idle position by a tubular rubber bushing which is under torsional strain when the fifth wheel is horizontal. According to the present invention, the transverse pin of the mounting is fixed in place and rectangular in cross-section and is received in a passage of similar rectangular cross-section in the surrounding rubber. In such a case the pin is keyed into the rubber and any relative turning between the two is resisted by a combination of torsional and compressional stresses in the rubber, with the latter predominating. If, therefore, the pin and its receiving passage in the rubber are so oriented that such resistance occurs when the fifth wheel is raised from idle to horizontal position, the result is a constant tendency of the wheel to return to its idle position when released and in a positive manner. The keying structure giving rise to this action is permanent in nature and does not depend upon a rubber-to-metal bond as in the case of a cylindrical interface. It is a further advantage of the improved structure that wearing qualities are improved, rubber under compression being more resistant to cutting and tearing.

The drawings show a standard or typical fifth wheel mounted in accordance with the principles of the invention, it being understood that the showing is of the preferred or best known embodiment of the invention and is not to be taken as limiting it to the details shown and described herein.

Figure 1:
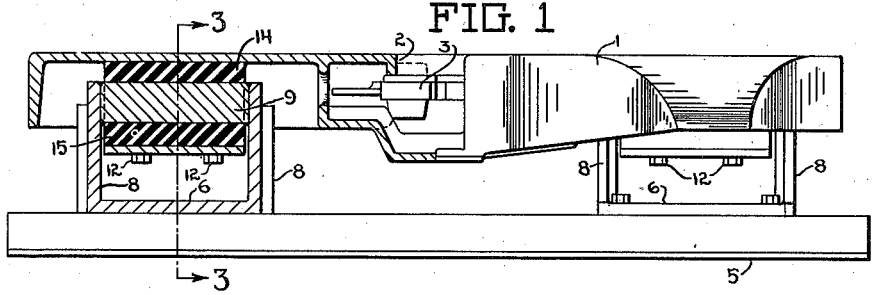
Fig. 1 is a view looking from the rear at the fifth wheel in horizontal position, one side being taken on the vertical section indicated by the line 1—1 of Fig. 2.
Figure 2:
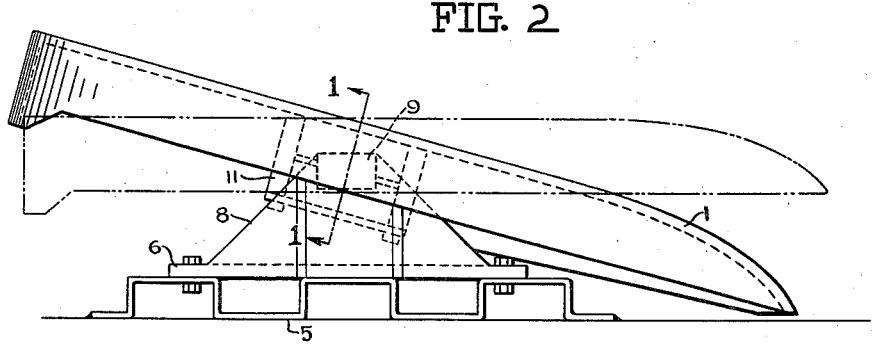
Fig. 2 is a side elevation, the normal idle position being shown in full lines and the operative position which the fifth wheel assumes in service being shown in dotted lines.
Figure 3:
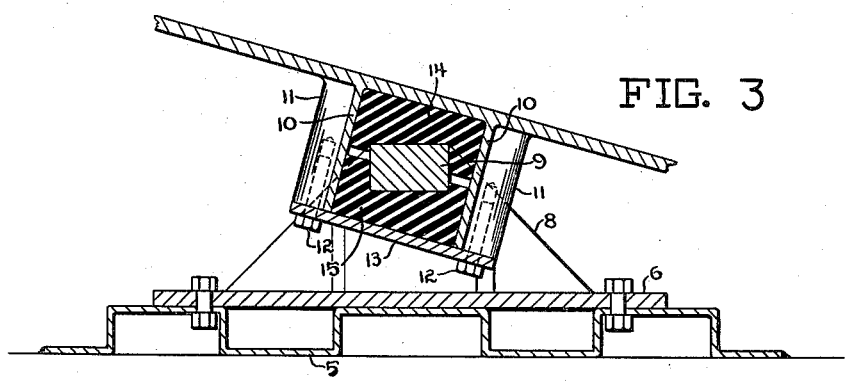
Fig. 3 is a section on the line 3—3 of Fig. 1.

As fifth wheels of various types are standardized, the details thereof will not be described, it being sufficient to say that the main body of the fifth wheel is a platform 1 provided with a V-shaped slot 2 for the reception of the king pin on the trailer and with locking means indicated at the numeral 3 for engaging the king pin to couple the two vehicles together.

The deck of the tractor is shown as a plate 5 and on this plate are the two aligned brackets 6 which are formed with the uprights 8. Inasmuch as the structure is symmetrical on the two sides of the king pin, only one side need be referred to. A pin 9 of rectangular cross-section is fixed as by welding to the pair of uprights 8 at a position sufficiently above the bracket 6 to afford clearance for the dependent and interlocking portions of the fifth wheel. The latter comprise a pair of dependent legs 10 of a width slightly less than the length of the pin 9 and carry strengthening ribs 11 which also serve to receive the bolts 12 by means of which a cover plate 13 is secured. The platform 1, legs 10 and cover 13 constitute a housing for the rubber matrix shown as composed of an upper section 14 and a lower section 15. These contain cavities in their inner faces which in juxtaposition of the two sections define a lateral passage in the matrix as a whole which is complementary in section to a section of the pin 9. Preferably the over-all dimensions of the matrix will will be such that when the cover plate 13 is securely in place, the cavity in the matrix will snugly engage the pin. No surface bonding of the matrix to the pin is necessary since the structure is self-locking for the purposes required. It may also be desirable to clamp the matrix into place under considerable pressure because in the rocking of the fifth wheel the occurrence of compression is localized and is accompanied by lessening of compression in other areas. Thus, a pre-compression will ensure that some compression remains substantially throughout the matrix. In such case the matrix, before being clamped in place, will be somewhat narrower and deeper than its housing.

Whereas the pin 9 has been shown with flat sides horizontal and vertical respectively, obviously it could be otherwise oriented and the orientation of the cavities in the rubber matrix changed accordingly, the tilting bias being thus maintained. However, the form shown is preferred since it presents no sharp corners to the main loads occurring in service. And while the pin has been shown as carried by the tractor portion of the vehicle, obviously the positions of the pin and matrix could be interchanged without impairment or lessening of the general benefits of the invention.

Although the matrix has been referred to as rubber, any acceptable substitute may be employed in place thereof.

The pin of rectangular section shown represents a preferred embodiment. However, I do not wish to be limited to the exact form or proportions shown, since pins with cross-sections of other geometric form other than truly circular may be employed, which will give the desired mechanical locking as distinguished from interfacial bonding to resist torsional shear or slippage.

The foregoing reservations are not exhaustive and the invention is to be construed as limited only as shall appear from the spirit and scope of the appended claims.

What is claimed is:

1. In a fifth wheel arrangement for tractors, of the type having a support, a load-bearing platform pivoted on the support, a fixed pin on the support, means on the platform surrounding the pin, and a matrix of rubber-like material in said means and in contact with the pin, the improvement wherein said pin has a cross-sectional profile other than circular, whereby to form a mechanical interlock with the matrix and said matrix is subjected to compressional strain as a consequence of turning about said pin, and said pin, matrix and means being so positioned and arranged relative to each other that said compressional strain is present when the platform is in horizontal working position and thereby serves to return the platform to idle position.

2. In a fifth wheel arrangement for tractors, of the type having a support, a load-bearing platform on the support, a fixed pin on the support, means on the platform surrounding the pin, and a matrix of rubber-like material in said means and in contact with the pin, the improvement wherein said pin has a polygonal cross-sectional profile whereby to form a mechanical interlock with the matrix, said matrix being thereby subjected to compressional strain as a consequence of turning about said pin, and said pin, matrix and means being so positioned and arranged that said compressional strain is present when the platform is in working position and serves to return the platform to idle position.

3. In a fifth wheel arrangement for tractors, of the type having a support, a load-bearing platform on the support, a fixed pin on the support, means on the platform surrounding the pin, and a matrix of rubber-like material in said means and in contact with the pin, the improvement wherein said pin has a rectangular, cross-sectional profile whereby to form a mechanical interlock with the matrix, said matrix being thereby subjected to compressional strain as a consequence of turning about said pin, and said pin, matrix and means being so positioned and arranged that said compressional strain is present when the platform is in working position, and serves to return the platform to tilted, idle position.

4. In a fifth wheel arrangement for tractors, of the type having a support, a load-bearing platform on the support, a fixed pin on the support, means on the platform surrounding the pin, and a matrix of rubber-like material in said means and in contact with the pin, the improvement wherein said pin has a rectangular, cross-sectional profile whereby to form a mechanical interlock with the matrix, said matrix being thereby subjected to compressional strain as a consequence of turning about said pin, said pin being disposed with parallel flat surfaces horizontal, and the portions of the matrix contacting said surfaces being disposed at an angle to the platform whereby when the platform is horizontal, the matrix is subjected to compression.

5. The combination of claim 4, said horizontal surfaces of the pin being of greater width than the depth of the pin.

DANIEL A. WALTHER.

REFERENCES CITED

The following references are of record in the file of this patent:

UNITED STATES PATENTS

| Number | Name | Date |
| --- | --- | --- |
| 2,255,820 | Schieferstein | Sept. 16, 1941 |
| 2,263,521 | Schieferstein | Nov. 18, 1941 |
| 2,438,323 | Miller | Mar. 23, 1948 |